(12) United States Patent
Shoji et al.

(10) Patent No.: US 7,079,877 B2
(45) Date of Patent: Jul. 18, 2006

(54) FOLDABLE PORTABLE TELEPHONE

(75) Inventors: Hideaki Shoji, Hyogo (JP); Yasuhito Imanishi, Hyogo (JP); Toru Fukasawa, Hyogo (JP); Yasuhiro Nishioka, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 543 days.

(21) Appl. No.: 09/938,592

(22) Filed: Aug. 27, 2001

(65) Prior Publication Data

US 2002/0169010 A1 Nov. 14, 2002

(30) Foreign Application Priority Data

May 8, 2001 (JP) ........................................ 2001-137740

(51) Int. Cl.
*H04B 1/38* (2006.01)

(52) U.S. Cl. ................................. 455/575.5; 455/575.3; 455/575.1; 455/575.7

(58) Field of Classification Search .............. 455/575.1, 455/575.3, 575.5, 575.7, 301; 343/702, 841, 343/301

See application file for complete search history.

(56) References Cited

U.S. PATENT DOCUMENTS

| | | | |
|---|---|---|---|
| 4,471,493 A | | 9/1984 | Schober |
| 4,723,305 A | * | 2/1988 | Phillips et al. ............ 455/575.7 |
| 4,876,552 A | * | 10/1989 | Zakman ...................... 343/702 |
| 4,992,799 A | * | 2/1991 | Garay ......................... 343/702 |
| 5,335,366 A | * | 8/1994 | Daniels ................... 455/575.5 |
| 5,335,368 A | | 8/1994 | Tamura |
| 5,561,437 A | * | 10/1996 | Phillips et al. .............. 343/702 |
| 5,649,306 A | | 7/1997 | Vannatta et al. |
| 5,754,141 A | * | 5/1998 | Thompson et al. .......... 343/702 |
| 5,940,745 A | * | 8/1999 | Imura ....................... 455/575.7 |
| 6,014,113 A | * | 1/2000 | Orchard et al. ............. 343/841 |
| 6,204,825 B1 | * | 3/2001 | Wilz .......................... 343/841 |
| 6,252,554 B1 | * | 6/2001 | Isohatala et al. ..... 343/700 MS |
| 6,266,538 B1 | * | 7/2001 | Waldron ................... 455/575.7 |
| 6,285,893 B1 | | 9/2001 | Keirinbou |
| 6,292,148 B1 | | 9/2001 | Matsuura et al. |
| 6,327,485 B1 | | 12/2001 | Waldron |
| 6,417,817 B1 | * | 7/2002 | Pirila et al. ................. 343/841 |
| 6,633,262 B1 | * | 10/2003 | Shoji et al. ................. 343/702 |
| 2002/0075185 A1 | * | 6/2002 | Wang ................. 343/700 MS |

FOREIGN PATENT DOCUMENTS

| | | |
|---|---|---|
| EP | 0 518 526 | 12/1992 |
| GB | 2 327 572 | 1/1999 |
| JP | 04-354425 | 12/1992 |
| JP | 06-216621 | 8/1994 |
| JP | 6-260949 | 9/1994 |
| JP | 08-139522 | 5/1996 |
| JP | 8-172374 | 7/1996 |
| JP | 11-168316 | 6/1999 |
| JP | 11-234162 | 8/1999 |
| JP | 11-312920 | 11/1999 |
| JP | 2000-013133 | 1/2000 |
| JP | 2000-216611 | 8/2000 |
| JP | 2001-102949 | 4/2001 |
| JP | 2001-345882 | 12/2001 |

\* cited by examiner

*Primary Examiner*—Lee Nguyen
*Assistant Examiner*—Lewis West
(74) *Attorney, Agent, or Firm*—Oblon, Spivak, McClelland, Maier & Neustadt, P.C.

(57) ABSTRACT

In a foldable portable telephone, a shield box provided within an upper casing is connected via a flexible cable to an output terminal of a transmitting circuit provided within a lower casing, and the shield box is used as an antenna. Thus, compared to the conventional case where a rod antenna is provided at an upper end of the lower casing, variation in gain dependent on a state of the user's hand holding the portable telephone is lessened.

17 Claims, 7 Drawing Sheets

FOLDABLE PORTABLE TELEPHONE

BACKGROUND OF THE INVENTION

1. Field of the Invention

The present invention relates to portable telephones, and more particularly, to a portable telephone having first and second casings coupled to each other via a hinge portion and foldable about the hinge portion.

2. Description of the Background Art

Figure 14:
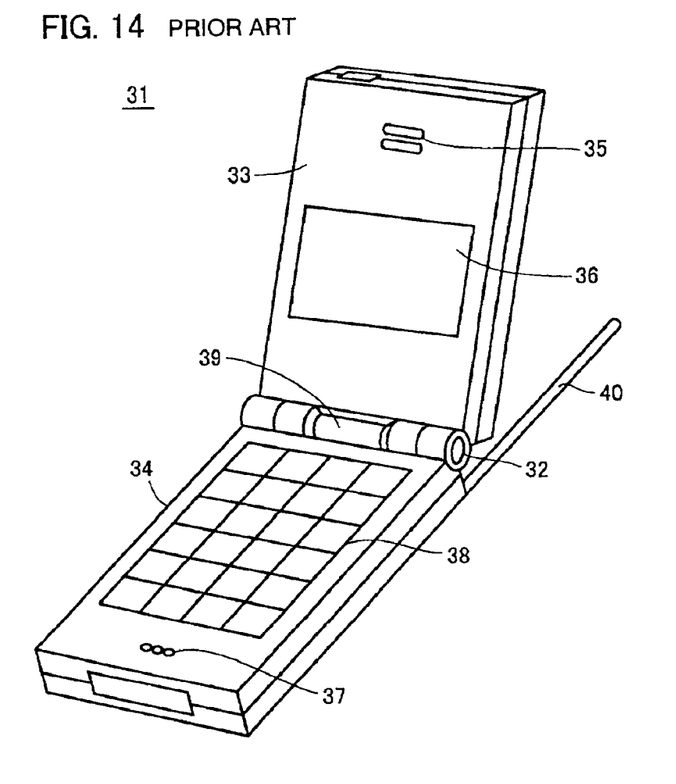
FIG. 14 is a perspective view showing a structure of a conventional portable telephone.

FIG. 14 is a perspective view showing a structure of a conventional portable telephone 31. Referring to FIG. 14, portable telephone 31 is provided with an upper casing 33 and a lower casing 34 that are coupled with each other via a hinge portion 32, and is foldable about hinge portion 32.

A receiver 35 and a liquid crystal panel 36 are provided on the surface of upper casing 33. A transmitter 37 and a keypad 38 are provided on the surface of lower casing 34. Upper casing 33 and lower casing 34 are connected to each other via a flexible cable 39. A retractable rod antenna 40 is provided at an upper end of lower casing 34. Rod antenna 40 is used for transmitting signals to and receiving signals from a base station.

A user of portable telephone 31 holds lower casing 34 in his/her hand, and talks on the phone bringing receiver 35 close to his/her ear. When not in use, portable telephone 31 is folded and put away, e.g., in a pocket of the user's garment.

With the conventional portable telephone 31, however, the user's hand is likely to touch or cover rod antenna 40. This considerably decreases gain, thereby degrading the communication condition.

SUMMARY OF THE INVENTION

Accordingly, a main object of the present invention is to provide a portable telephone that suffers less variation in gain dependent on a state of the user's hand.

The portable telephone according to the present invention includes: first and second electronic circuit portions provided within first and second casings, respectively; and first and second shield members for shielding the first and second electronic circuit portions, respectively. At least one of the first and second shield members additionally serves as an antenna of the portable telephone. Since the shield member used as the antenna is considerably larger than a conventional antenna, variation in gain dependent on a state of the user's hand holding the portable telephone can be alleviated, so that a stable communication condition is realized.

Preferably, the first electronic circuit portion includes a communication circuit for communicating with a base station using the second shield member as the antenna. In this case, by causing the user to hold the first casing, the variation in gain dependent on a state of the user's hand can further be lessened.

Preferably, the second shield member includes a slit for adjusting its characteristics as the antenna. In this case, by adjusting the shape and dimensions of the slit, the characteristics of the second shield member as the antenna can be optimized.

Still preferably, the second shield member includes an extended portion for adjusting its characteristics as the antenna. In this case, by adjusting the shape and dimensions of the extended portion, the characteristics as the antenna of the second shield member can be optimized.

Preferably, the portable telephone above is further provided with an antenna matching circuit that is connected between the communication circuit and the second shield member. In this case, signal transmission/reception can be performed efficiently.

Preferably, the portable telephone above is further provided with: a first antenna matching circuit for matching when the portable telephone is unfolded; a second antenna matching circuit for matching when the portable telephone is folded; a detector for detecting whether the portable telephone is folded; and a switching circuit operating based on the detected result of the detector, to connect the first antenna matching circuit between the communication circuit and the second shield member when the portable telephone is unfolded, and to connect the second antenna matching circuit between the communication circuit and the second shield member when the portable telephone is folded. In this case, regardless of whether or not the portable telephone is folded, efficient signal transmission/reception is enabled.

Still preferably, the portable telephone above is further provided with an antenna that is mounted to the first casing and has its feeding portion connected to the communication circuit. The communication circuit communicates with the base station via the second shield member and the antenna. In this case, the variation in gain dependent on a state of the user's hand can further be alleviated, since both the second shield member and the antenna are employed.

Preferably, the portable telephone above is further provided with an antenna that is mounted to the second casing and has its feeding portion connected to the second shield member. The communication circuit communicates with the base station via the second shield member and the antenna. In this case, again, the variation in gain dependent on a state of the user's hand can further be alleviated, since both the second shield member and the antenna are used.

Still preferably, the portable telephone above is further provided with an antenna matching circuit that is connected between the second shield member and the feeding portion of the antenna. In this case, efficient signal transmission/reception is enabled.

Preferably, the portable telephone above is further provided with: an antenna that is mounted to the first casing; a detector for detecting whether a hand of a user of the portable telephone is touching the antenna; and a switching circuit operating based on the detected result of the detector, to connect the communication circuit to the antenna when the user's hand is not touching the antenna, and to connect the communication circuit to the second shield member when the user's hand is touching the antenna. The communication circuit communicates with the base station via the antenna or the second shield member that is connected thereto by the switching circuit. In this case, a good communication condition is ensured regardless of whether or not the user's hand is touching the antenna.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
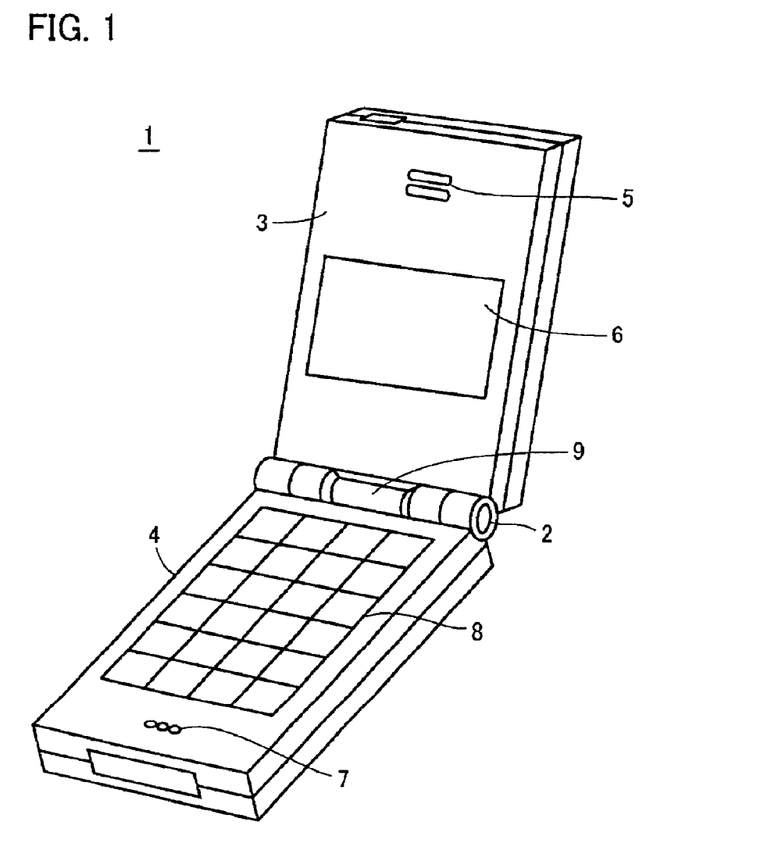
FIG. 1 is a perspective view showing a structure of the portable telephone according to an embodiment of the present invention.

FIG. 1 is a perspective view showing a structure of the portable telephone 1 according to an embodiment of the present invention. Referring to FIG. 1, portable telephone 1 includes an upper casing 3 and a lower casing 4 connected to each other via a hinge portion 2, and is foldable about hinge portion 2.

A receiver 5 and a liquid crystal panel 6 are provided on a surface of upper casing 3. A transmitter 7 and a keypad 8 are provided on a surface of lower casing 4. A flexible cable 9 connects upper casing 3 and lower casing 4. Provided within upper casing 3 is a shield box 14, which will be described later. This shield box 14 additionally serves as an antenna for transmitting and receiving signals to and from a base station.

A user of portable telephone 1 holds the lower casing in his/her hand, and talks on the phone with his/her ear close to receiver 5. When not in use, portable telephone 1 is folded and put away, e.g., in a pocket of the user's garment.

Figure 2:
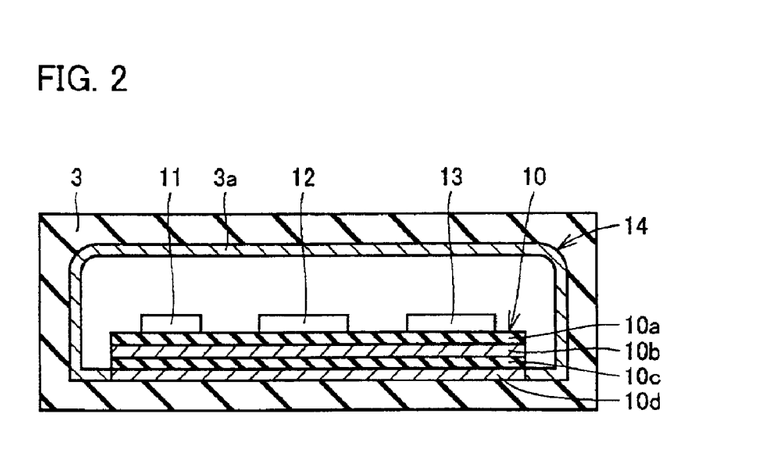
FIG. 2 is a cross sectional view showing the upper casing shown in FIG. 1 and an inner structure thereof.

FIG. 2 is a cross sectional view showing upper casing 3 and an inner structure thereof. Referring to FIG. 2, at least the surfaces of upper casing 3 are formed of an insulator, and a shield layer 3a formed of a conductive member covers the inner walls thereof. A multilayer substrate 10 is accommodated in upper casing 3, and various kinds of electronic components 11–13, . . . constituting a liquid crystal display and others are mounted on the surface of multilayer substrate 10.

Multilayer substrate 10 is formed of a plurality of conductive layers and a plurality of insulating layers stacked alternately one on another. The respective conductive layers are used for a power supply layer, a ground layer, a signal interconnection layer and others. For simplification of the drawing, only a ground layer 10b for electronic components 11–13, . . . a ground layer 10d for shielding, an insulating layer 10a provided between electronic components 11–13, . . . and ground layer 10b, and an insulating layer 10c interposed between ground layers 10b and 10d are illustrated in FIG. 2. Ground layer 10d and shield layer 3a, conducting to each other, constitute the shield box 14. Shield box 14 protects electronic components 11–13, . . . from external noise, prevents noise generated in electronic components 11–13, . . . from leaking outward, and additionally works as an antenna.

Figure 3:
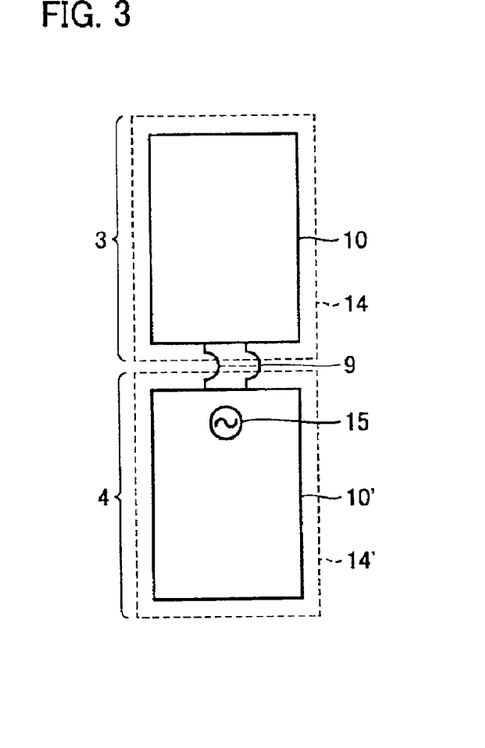
FIG. 3 is a block diagram showing the inner structure of the portable telephone shown in FIG. 1.

Lower casing 4 and its interior have structures basically identical to those of upper casing 3 and its interior. More specifically, as shown in FIG. 3, lower casing 4 includes a multilayer substrate 10' and a shield box 14' for shielding the substrate. Multilayer substrate 10' and shield box 14' have the same structures as multilayer substrate 10 and shield box 14 shown in FIG. 2. A plurality of electronic components constituting a transmitting circuit 15, a receiving circuit and others are mounted on the surface of multilayer substrate 10'.

Multilayer substrate 10 within upper casing 3 and multilayer substrate 10' within lower casing 4 are connected to each other via a flexible cable 9. Of the multilayer substrates 10 and 10', ground layers 10b and 10b' for electronic components conduct to each other, and ground layers 10d and 10d' for shielding also conduct to each other. Ground layers 10b, 10b' for electronic components and ground layers 10d, 10d' for shielding are insulated from each other.

Figure 4:
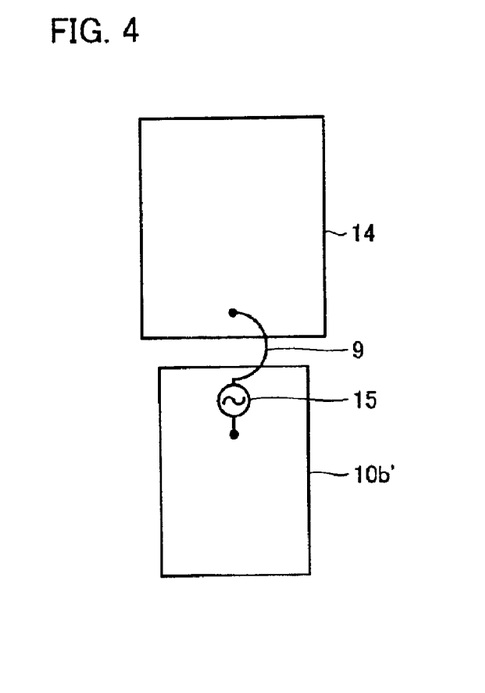
FIG. 4 is a circuit block diagram showing a relation between the shield box and the transmitting circuit shown in FIG. 3.

In this portable telephone 1, as shown in FIG. 4, a ground terminal of transmitting circuit 15 is connected to ground layer 10b' of multilayer substrate 10', and an output terminal of transmitting circuit 15 is connected via flexible cable 9 to ground layer 10d of multilayer substrate 10 or to shield box 14. The outer sheath of shield box 14 is used as the antenna. Since the shield box 14 is considerably larger than the conventional rod antenna 40, variation in gain dependent on a state of the user's hand holding portable telephone 1 is lessened than in the conventional case, so that stable signal transmission/reception is enabled.

Hereinafter, various kinds of variations of this embodiment will be described with reference to FIGS. 5–13. In the variation shown in FIG. 5, a rod antenna 16 is further provided to the embodiment shown in FIG. 4. Rod antenna 16 is mounted to lower casing 4, and its base end (a feeding portion) is connected to the output terminal of transmitting circuit 15. In this case, rod antenna 16 is used in addition to shield box 14 serving as the antenna, and thus, high gain is obtained. Accordingly, the variation in gain dependent on a state of the user's hand holding portable telephone 1 is further lessened than in the conventional case.

In the variation shown in FIG. 6, again, rod antenna 16 is further provided to the embodiment of FIG. 4. In this variation, however, rod antenna 16 is mounted to upper casing 3, and its base end is connected to an upper end of shield box 14. In this case, shield box 14 is used as the antenna and also as a power transmission line, and rod antenna 16 is also utilized. Accordingly, high gain is obtained, and the variation in gain dependent on a state of the user's hand is alleviated.

Figure 7:
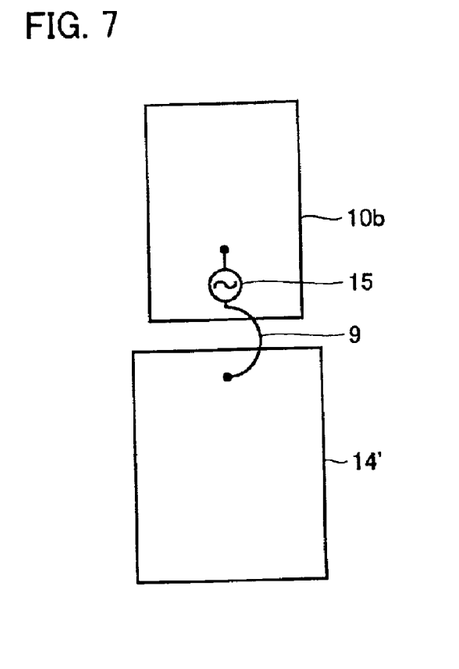

In the variation shown in FIG. 7, transmitting circuit 15 and others are provided on the upper casing 3 side, while liquid crystal panel 6 and others are provided on the lower casing 4 side. It is configured such that the user holds upper casing 3 when talking on the phone. The ground terminal of transmitting circuit 15 is connected to ground layer lob of multilayer substrate 10, and the output terminal of transmitting circuit 15 is connected via flexible cable 9 to shield box 14'. In this case, again, the variation in gain dependent on a state of the user's hand is alleviated.

Figure 8:
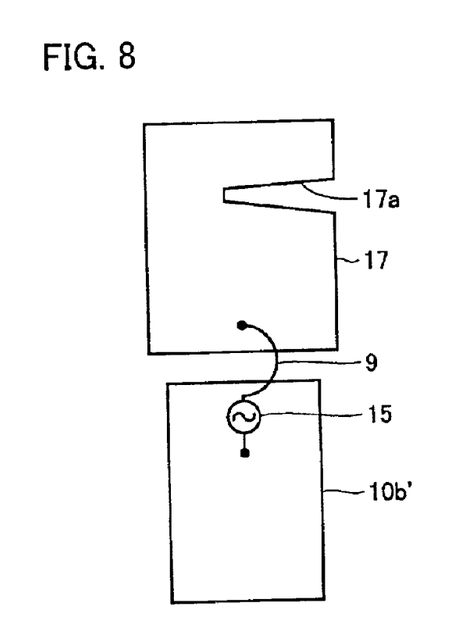

In the variation shown in FIG. 8, shield box 14 of the embodiment of FIG. 4 is replaced with a shield box 17. Shield box 17 is provided with a slit 17a to cause the antenna current to detour. By adjusting the shape and dimensions of slit 17a, it is possible to optimize the characteristics of shield box 17 as an antenna.

Figure 9:
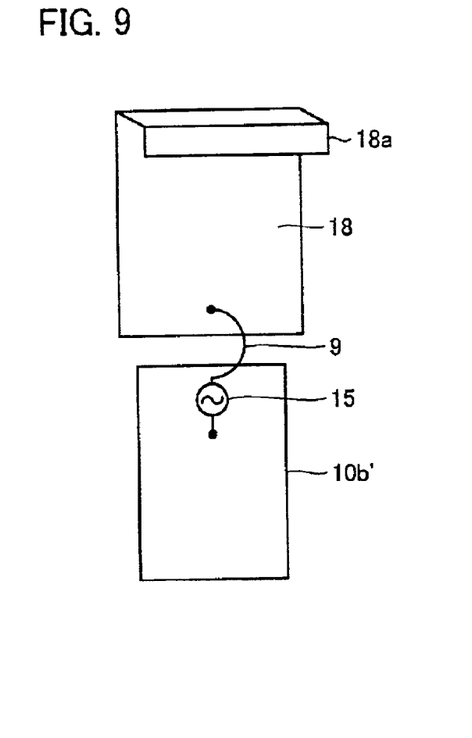

In the variation shown in FIG. 9, shield box 17 of the variation in FIG. 8 is replaced with a shield box 18. Shield box 18 is provided with a fin 18a at its end portion for adjustment of a length of the current path. Adjusting the shape and dimensions of fin 18a enables the characteristics of shield box 18 as an antenna to be optimized.

Figure 10:
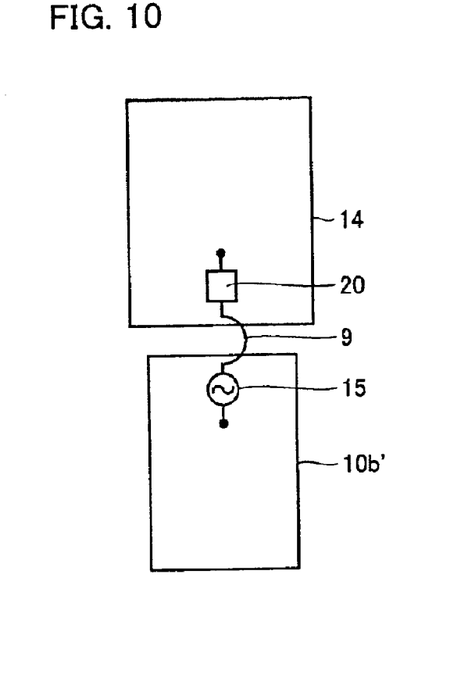

In the variation shown in FIG. 10, a matching circuit 20 is interposed between flexible cable 9 and shield box 14 of the embodiment shown in FIG. 4. In this case, it is possible to minimize a reflection level and input impedance of a signal in shield box 14, and thus, efficient signal transmission/reception is enabled. Alternatively, matching circuit 20 may be interposed between the output terminal of transmitting circuit 15 and flexible cable 9.

Figure 6:
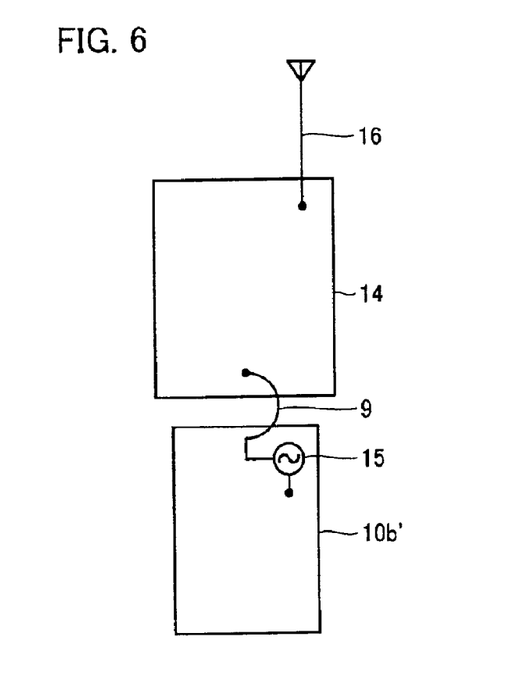
Figure 11:
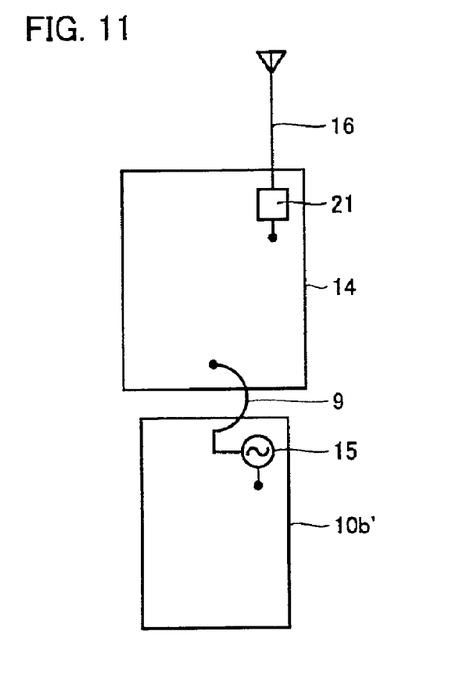

In the variation shown in FIG. 11, a matching circuit 21 is interposed between the base end of rod antenna 16 and shield box 14 of the variation shown in FIG. 6. In this case, a reflection level and input impedance of a signal in rod antenna 16 can be minimized, so that efficient signal transmission/reception is enabled. Matching circuit 21 may be interposed between flexible cable 9 and shield box 14, or between flexible cable 9 and the output terminal of transmitting circuit 15.

Figure 12:
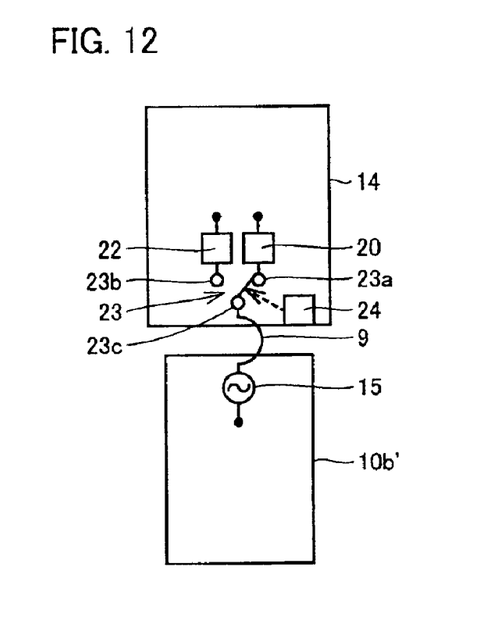

The variation shown in FIG. 12 is the case where a matching circuit 22, a switch 23 and a sensor 24 are added to the variation shown in FIG. 10. Switch 23 has an output terminal 23c that is connected via flexible cable 9 to the output terminal of transmitting circuit 15, one switching terminal 23a that is connected via matching circuit 20 to shield box 14, and the other switching terminal 23b that is connected via matching circuit 22 to shield box 14. Matching circuit 20 is configured to minimize a reflection level and input impedance of a signal in shield box 14 in the state where the portable telephone is unfolded. Matching circuit 22 is configured to minimize the reflection level and input impedance of the signal in shield box 14 in the state where the portable telephone is folded. Sensor 24 detects whether the portable telephone is folded, and outputs a signal of an H level when it is unfolded, and outputs a signal of an L level when it is folded.

When the portable telephone is unfolded, the signal of an H level output from sensor 24 causes terminals 23c and 23a of switch 23 to conduct. Thus, the output terminal of transmitting circuit 15 is connected via flexible cable 9, switch 23 and matching circuit 20 to shield box 14.

When the portable telephone is folded, the signal of an L level output from sensor 24 causes terminals 23c and 23b of switch 23 to conduct. Thus, the output terminal of transmitting circuit 15 is connected via flexible cable 9, switch 23 and matching circuit 22 to shield box 14. Accordingly, regardless of whether the portable telephone is folded or not, the input impedance and reflection level of the signal in shield box 14 can be minimized, and thus, efficient signal transmission/reception is enabled.

Figure 5:
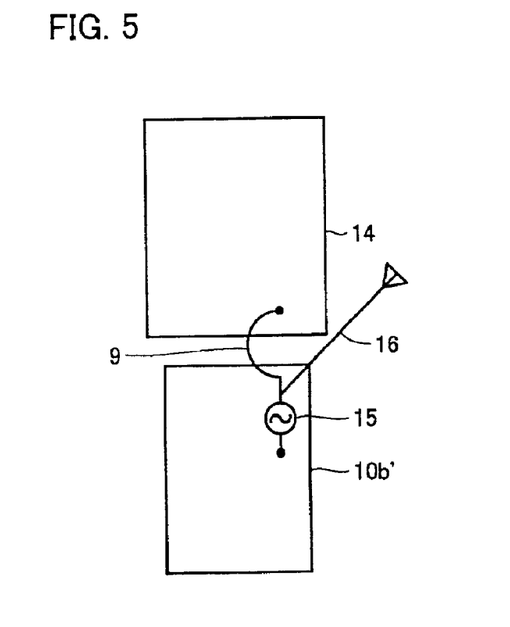
FIGS. 5–13 are circuit block diagrams showing variations of the embodiment of the present invention.
Figure 13:
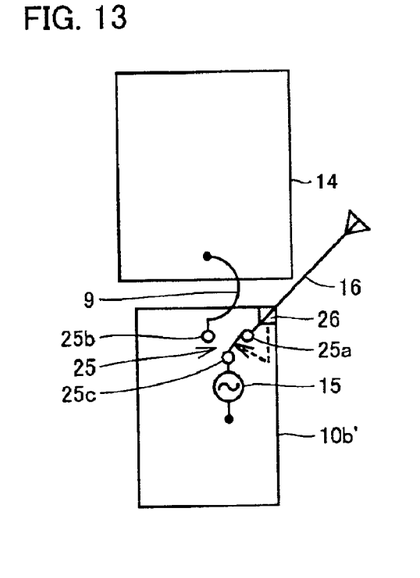

The variation shown in FIG. 13 is the case where a switch 25 and a sensor 26 are added to the variation shown in FIG. 5. Switch 25 has a IBM common terminal 25c connected to the output terminal of transmitting circuit 15, one switching terminal 25a connected to the base end of rod antenna 16, and the other switching terminal 25b connected via flexible cable 9 to shield box 14. Sensor 26 detects whether the user's hand is touching rod antenna 16. When the hand is not touching the antenna, sensor 26 outputs a signal of an H level. If the hand is touching the antenna, it outputs a signal of an L level.

When the user's hand holding the portable telephone is not touching rod antenna 16, the signal of an H level output from sensor 26 causes terminals 25c and 25a of switch 25 to conduct, and the output terminal of transmitting circuit 15 is connected via switch 25 to rod antenna 16.

When the user's hand is touching rod antenna 16, the signal of an L level output from sensor 26 causes terminals 25c and 25b of switch 25 to conduct, so that the output terminal of transmitting circuit 15 is connected via switch 25 and flexible cable 9 to shield box 14. Accordingly, regardless of whether the hand of a user holding the portable telephone is touching rod antenna 16 or not, high gain can be obtained, so that stable signal transmission/reception is enabled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A foldable portable telephone having first and second casings coupled with each other via a hinge portion, comprising:

a transmitt circuit including an output terminal;

first and second electronic circuit portions provided within said first and second casings, respectively; and first and second shield members configured to shield said first and second electronic circuit portions from external noise, respectively, and to prevent noise generated in respective of said first and second electronic circuit portions from leaking outward, at least one of said first and second shield members connecting to the output terminal of the transmitting circuit and additionally serving as an antenna for said portable telephone.

2. The portable telephone according to claim 1, wherein said first electronic circuit portion includes a communication circuit for communicating with a base station using said second shield member as the antenna.

3. The portable telephone according to claim 2, wherein said second shield member includes a slit for adjusting its characteristics as the antenna.

4. The portable telephone according to claim 2, wherein said second shield member includes an extended portion for adjusting its characteristics as the antenna.

5. The portable telephone according to claim 2, further comprising an antenna matching circuit connected between said communication circuit and said second shield member.

6. The portable telephone according to claim 2, further comprising:

a first antenna matching circuit for matching when said portable telephone is unfolded;

a second antenna matching circuit for matching when said portable telephone is folded;

a detector for detecting whether said portable telephone is folded; and a switching circuit operating based on a detected result of said detector, for connecting said first antenna matching circuit between said communication circuit and said second shield member when said portable telephone is unfolded, and for connecting said second antenna matching circuit between said communication circuit and said second shield member when said portable telephone is folded.

7. The portable telephone according to claim 2, further comprising an antenna mounted to said first casing and having its feeding portion connected to said communication circuit, said communication circuit communicating with said base station via said second shield member and said antenna.

8. The portable telephone according to claim 2, further comprising an antenna mounted to said second casing and having its feeding portion connected to said second shield member, said communication circuit communicating with said base station via said second shield member and said antenna.

9. The portable telephone according to claim 8, further comprising a matching circuit for said antenna that is connected between said second shield member and the feeding portion of said antenna.

10. The portable telephone according to claim 2, further comprising:

an antenna mounted to said first casing;

a detector for detecting whether a hand of a user of said portable telephone is touching said antenna; and a switching circuit operating based on a detected result of said detector, for connecting said communication circuit to said antenna when said user's hand is not touching said antenna, and for connecting said communication circuit to said second shield member when said user's hand is touching said antenna, said communication circuit communicating with said base station via either one of said antenna and said second shield member that is connected to said communication circuit by said switching circuit.

11. The portable telephone according to claim 1, wherein the first shield member comprises a shield box containing the first electronic circuit portion.

12. The portable telephone according to claim 1, wherein the second shield member comprises a shield box containing the second electronic circuit portion.

13. The portable telephone according to claim 12, wherein the first shield member comprises a shield box containing the first electronic circuit portion.

14. The portable telephone according to claim 1, wherein the second electronic circuit portion includes the transmitting circuit for transmitting signals and a ground layer, and the output terminal of said transmitting circuit is connected via said hinge portion to said first shield member, and a ground terminal of said transmitting circuit is connected to said ground layer.

15. The portable telephone according to claim 1, wherein said first casing is an upper casing and said second casing is a lower casing, and said second casing is adopted to be held in a user's hand.

16. A portable telephone, comprising:

a first electronic circuit portion;

a second electronic circuit portion;

a substrate including a ground layer and having said second electronic circuit portion mounted theron;

a sheild member including a shield layer, the shield layer being formed of a conductive member shielding said second electronic circuit portion on said substrate and in electrical conduction with said ground layer of said substrate;

a communication circuit comprising an electronic part included in said first electronic circuit portion and electrically connected to said ground layer; and a conduction member electrically connecting communication circuit to said ground layer.

17. The portable telephone according to claim 16, further comprising:

a first casing provided with an operating portion and accommodating said first electronic circuit portion therein;

a second casing provided with a dispaly portion and accommodating said substrate therein; and an antenna mounted to one of said first casing and siad second casing;

said communication circuite being electrocally to said antenna and said ground layer of siad substarte

\* \* \* \* \*